US011999172B2

(12) United States Patent
Benito Echevarria et al.

(10) Patent No.: US 11,999,172 B2
(45) Date of Patent: Jun. 4, 2024

(54) PRE-TREATMENTS FOR INK-JET PRINTING

(71) Applicant: Hewlett-Packard Development Company, L.P., Spring, TX (US)

(72) Inventors: Sara Benito Echevarria, Sant Cugat del Valles (ES); Marta Blanch Pinol, Sant Cugat del Valles (ES); Cristina Crespi Argemi, Sant Cugat del Valles (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 17/641,777

(22) PCT Filed: Sep. 23, 2019

(86) PCT No.: PCT/US2019/052431
§ 371 (c)(1),
(2) Date: Mar. 9, 2022

(87) PCT Pub. No.: WO2021/061088
PCT Pub. Date: Apr. 1, 2021

(65) Prior Publication Data

US 2023/0364923 A1 Nov. 16, 2023

(51) Int. Cl.
*B41J 11/00* (2006.01)
*B41J 2/21* (2006.01)

(52) U.S. Cl.
CPC ........... *B41J 2/2114* (2013.01); *B41J 2/2103* (2013.01); *B41J 11/0015* (2013.01); *B41J 11/009* (2013.01); *B41J 2203/011* (2020.08)

(58) Field of Classification Search
CPC ...... B41J 2/2114; B41J 2/2103; B41J 11/009; B41J 2203/011; B41J 11/0015
See application file for complete search history.

(56) References Cited

U.S. PATENT DOCUMENTS 8,465,118 B2 6/2013 Emamjomeh et al.
9,233,557 B2 1/2016 Hoshina et al.
(Continued)

FOREIGN PATENT DOCUMENTS

CN 102152679 8/2011
WO WO-2018017307 1/2018
WO WO-2018143960 8/2018

OTHER PUBLICATIONS

International Search Report and Written Opinion dated Jun. 4, 2020, issued in PCT/US2019/052431, filed Sep. 23, 2019. (5 pages).

*Primary Examiner* — Yaovi M Ameh

(57) ABSTRACT

Disclosed herein is a print head arrangement, a printing device and a method of operating a printing device. The print head arrangement comprises a main print head having a plurality of printing nozzles for ejecting a printing fluid and an auxiliary print head having a plurality of pre-treatment nozzles for ejecting a pre-treatment fluid. The print head arrangement further comprises a controller that is to obtain a print medium parameter and to select a subset of the plurality of pre-treatment nozzles for application of the pre-treatment fluid based on the print medium parameter. The print medium parameter characterizes a thermal inertia of the print medium.

15 Claims, 9 Drawing Sheets

(56) References Cited

U.S. PATENT DOCUMENTS

| | | | |
|---|---|---|---|
| 9,321,280 B2 | 4/2016 | Gracia Verdugo et al. | |
| 9,962,957 B2 | 5/2018 | Kamibayashi et al. | |
| 2014/0232783 A1 | 8/2014 | Del Rio | |
| 2015/0246558 A1* | 9/2015 | Gracia Verdugo | B41J 2/2114 347/21 |
| 2017/0151810 A1* | 6/2017 | Kamibayashi | B41J 11/009 |

* cited by examiner

400

| type | thermal inertia | porosity | overlap | subset size | PT pattern | PT amount | masking mode |
|---|---|---|---|---|---|---|---|
| A | high | low | partial | small | 306 | medium | interleaving |
| B | high | high | none | small | 304 | large | interleaving |
| C | low | low | partial | large | 300 | medium | ramp |
| D | low | high | complete | small | 302 | medium | ramp |

402 404 406 408

Fig. 4

900

| category | porosity | overlap | subset size | |
|---|---|---|---|---|
| a | low | partial | large | 902 |
| | medium | partial | medium | 904 |
| | high | complete | small | 906 |

Fig. 9

PRE-TREATMENTS FOR INK-JET PRINTING

CLAIM FOR PRIORITY

The present application is a national stage filing under 35 U.S.C 371 of PCT application number PCT/US2019/05243 having an international filing date of Sep. 23, 2019, the disclosure of which is hereby incorporated by reference in its entirety.

BACKGROUND

An ink-jet printer can eject droplets of a printing fluid containing color pigments onto a substrate. The fluid may evaporate subsequently, leaving behind the pigments on the substrate. While the fluid evaporates, a droplet may spread out on the substrate and may at least partially be absorbed by the substrate. This may lead to bleeding and may thus affect image quality.

BRIEF DESCRIPTION OF DRAWINGS

In the following, a detailed description of various examples is given with reference to the figures. The figures show schematic illustrations of FIG. 1: a print head arrangement a main print head and an auxiliary print head according to an example;

FIG. 4: a table of pre-treatment schemes in accordance with an example;

FIG. 9: a table of pre-treatment schemes to be selected based on a print-medium category and a fine-tuning parameter in accordance with an example.

DETAILED DESCRIPTION

To prevent or reduce spreading of a droplet of printing fluid ejected onto a substrate during evaporation, a pre-treatment fluid may be applied in addition to the printing fluid. The pre-treatment fluid may react with the printing fluid and may thereby fix the printing fluid on the substrate. The drying process may vary between different substrates such as paper, plastic or metal. Therefore, a scheme of applying the pre-treatment fluid optimized for one substrate may not yield optimal results for another substrate.

Figure 1:
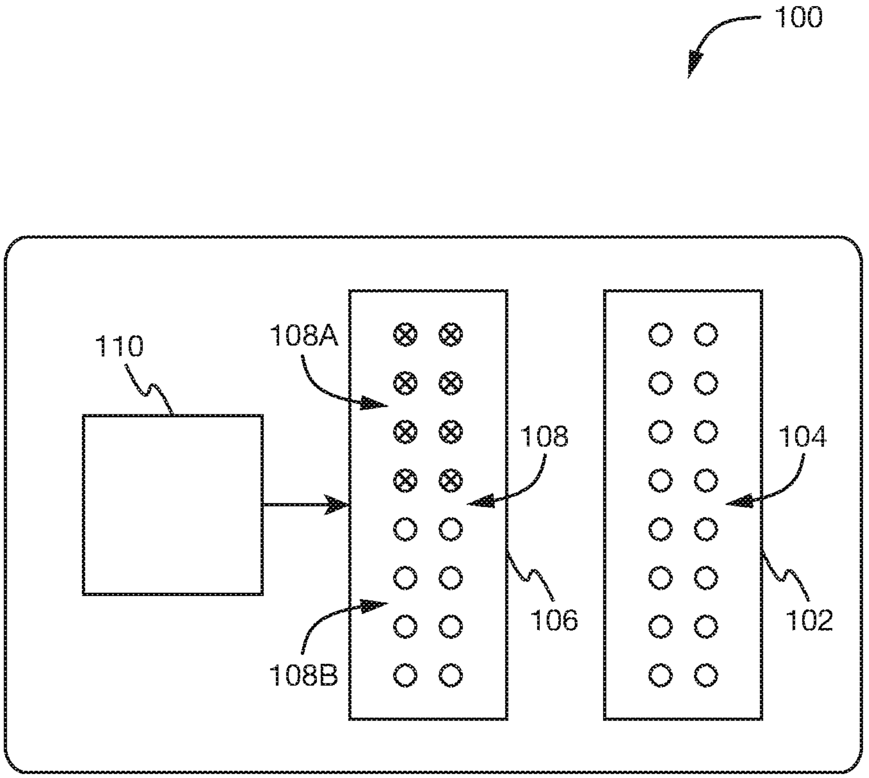

FIG. 1 depicts a schematic illustration of a print head arrangement 100 in accordance with an example. The print head arrangement 100 may be employed in a printing device, for example one of the printing devices 500 and 600 described below. The print head arrangement 100 comprises a main print head 102 that has a plurality of printing nozzles 104 for ejecting a printing fluid, e.g. onto a substrate (not shown). The printing fluid may for example be an ink comprising a liquid and pigments dissolved in the liquid.

The print head arrangement 100 further comprises an auxiliary print head 106. The auxiliary print head 106 has a plurality of pre-treatment nozzles 108 for ejecting a pre-treatment fluid, e.g. onto the same substrate on which the printing fluid is ejected. The pre-treatment fluid, which may also be referred to as an optimizer, may for example comprise a liquid in which a fixing agent is dissolved. The fixing agent may e.g. be to react with pigments in the printing fluid to cause the pigments to precipitate from the printing fluid. The fixing agent may for example be a polyvalent metal salt. Additionally, the pre-treatment fluid may also comprise other substances, for example a latex resin.

The print head arrangement 100 also comprises a controller 110. The controller 110 may be implemented in hardware, software or a combination thereof. The controller 110 may for example comprise a processor and a machine-readable medium containing instructions to be executed by the processor to provide the functionality described in the following. The controller 110 may e.g. be to execute the methods 700 and/or 800 described below or at least a part thereof.

The controller 110 is to obtain a print medium parameter, e.g. a print medium parameter of the print medium that the printing fluid and the pre-treatment fluid are to be deposited on. The print medium parameter may for example be selected manually by a user or may be detected automatically using a media type detector (not shown), e.g. as described below with reference to FIG. 6. In some examples, the print medium parameter may be associated with a type of print medium. The type of print medium may for example determine a value of the print medium parameter as detailed below with reference to FIG. 4. Accordingly, the print medium parameter may e.g. be obtained by obtaining the type of print medium. In other examples, the print medium parameter may be obtained in addition to the type of print medium, e.g. as described below with reference to FIG. 9.

The print medium parameter characterizes a thermal inertia of the print medium. The thermal inertia of a medium may be calculated as a value proportional to the square root of the heat capacity and of the thermal conductivity of the medium. The thermal inertia thus constitutes a measure of how fast the temperature of a medium increases when heating the medium. Accordingly, the evaporation rate of the pre-treatment fluid and/or of the printing fluid on the print medium may depend on the thermal inertia of the print medium. The thermal inertia of a print medium may be depend on a material that the print medium comprises as well as dimensions of the print medium, in particular its thickness. The print medium parameter may for example quantify an absolute value of the thermal inertia of the print medium. Alternatively, the print medium parameter may characterize the thermal inertia of the print medium in relative terms, e.g. as “low”, “medium” or “high”. The print medium parameter may in particular characterize a range of the thermal inertia. A “low” thermal inertia may e.g. indicate that the thermal inertia of the print medium is within a certain predetermined range.

The controller 110 is further to select a subset 108A of the plurality of pre-treatment nozzles 108, which is also referred to as the selected subset 108A. The subset 108A is a variable subset of the pre-treatment nozzles 108 comprising the pre-treatment nozzles that are to be used for application of the pre-treatment fluid. The remaining nozzles, which are not selected and thus not to be used for application of the pre-treatment fluid, form a subset 108B, which is also referred to as the remaining or non-selected subset 108B.

The controller 110 selects the subset 108A from the plurality of pre-treatment nozzles 108 based on the print medium parameter, for example by selecting the subset 108A based on the type of print medium. In other words, the selected subset 108A may be different for print media with different print medium parameters and/or print media of different types. In FIG. 1, an example is illustrated in which the upper half of the plurality of nozzles is selected by the controller 110 and contained in the subset 108A. Nozzles of the selected subset 108A are illustrated as circles marked with an "x", whereas the nozzles of the non-selected subset 108B, are illustrated as open circles. In other examples, e.g. for a different type of print medium, the subsets 108A and 108B may be different, i.e. the controller 110 may select other nozzles for applying the pre-treatment fluid.

In some examples, the print medium parameter may additionally characterize a porosity of the print medium. The porosity of a medium characterizes the fraction of void spaces in the medium. The porosity of the print medium may for example characterize the fraction of void spaces accessible to a fluid deposited on a surface of the print medium. Accordingly, the porosity of the print medium may affect an absorption rate of the pre-treatment fluid and/or printing fluid by the print medium. The print medium parameter may for example be one parameter that characterizes both the porosity and the thermal inertia of the print medium. Alternatively, the print medium parameter may be a tuple of parameters, wherein one parameter characterizes the porosity and the other parameter characterizes the thermal inertia of the print medium.

Figure 2:
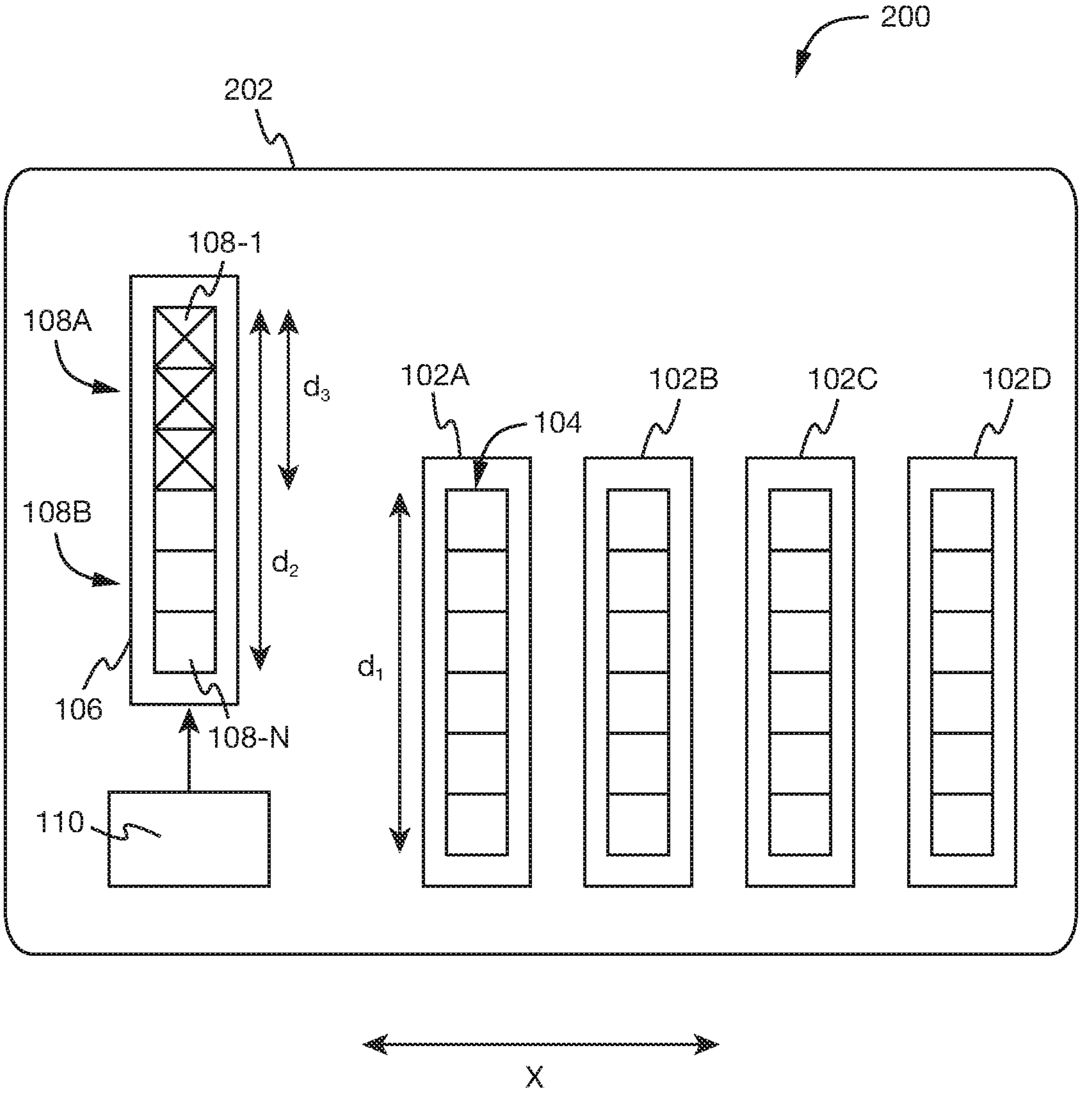
FIG. 2: a print head arrangement with partially overlapping main and auxiliary print heads in accordance with an example.

FIG. 2 illustrates a print head arrangement 200 according to another example. The print head arrangement 200 comprises a print head carriage 202. The carriage 202 may for example be mounted in a printing device such that the carriage 202 can be moved along a scanning direction X. The carriage 202 comprises a plurality of main print heads 102A, 102B, 102C, and 102D, which may for example be mounted in corresponding slots of the carriage 202 as detailed below with reference to FIG. 5. Each of the main print heads 102A-102D has a plurality of printing nozzles 104 for ejecting a printing fluid and may for example eject a printing fluid of a different color, e.g. cyan, magenta, yellow and black.

The print head carriage 202 further comprises an auxiliary print head 106, which may for example also be mounted in a corresponding slot of the carriage 202. The auxiliary print head 106 has a plurality of pre-treatment nozzles 108 for ejecting a pre-treatment fluid, e.g. as described above for the print head arrangement 100. The pre-treatment nozzles 108 comprise a plurality of groups of pre-treatment nozzles 108-1 to 108-N, e.g. six groups as shown in FIG. 2, in which each group is represented by a square. In other examples, the number of groups may be different and may for example be between 2 and 64 groups. Each of the groups 108-1 to 108-N may e.g. be arranged on an individual nozzle plate and may for example comprise between about 100 and 2000 nozzles. The plurality of printing nozzles 104 of each of the main print heads 102A-102D may also be grouped into a plurality of printing nozzle groups as illustrated by the respective squares in FIG. 2.

Similar to the print head arrangement 100, the print head arrangement 200 also comprises a controller 110 that is to obtain a print medium parameter and to select a subset 108A of the plurality of pre-treatment nozzles 108 based on the print medium parameter. As described above, the subset 108A is a variable subset of the pre-treatment nozzles 108 comprising the pre-treatment nozzles that are to be used for application of the pre-treatment fluid. The remaining nozzles that are not selected form the remaining or non-selected subset 108B. The controller may for example select the subset 108A by selecting some or all of the groups 108-1 to 108-N. In FIG. 2, an example is illustrated in which the upper half of the groups 108-1 to 108-N, i.e. the groups 108-1 to 108-3, are selected by the controller 110 and contained in the subset 108A, wherein the groups forming the subset 108A are marked with an "x". In other examples, e.g. for a different type of print medium, the subsets 108A and 108B may be different.

The printing nozzles 104 of the main print head 102A are distributed over a first distance $d_1$ perpendicular to the scanning direction X, i.e. the plurality of printing nozzles 104 extends over the distance $d_1$ perpendicular to the scanning direction X. The pre-treatment nozzles 108 are distributed over a second distance $d_2$ perpendicular to the scanning direction X. The second distance $d_2$ partially overlaps with the first distance $d_1$. In the context of the present disclosure, a distance $d_m$ partially overlaps with a distance $d_n$ if the distance $d_m$ comprises a first portion that completely overlaps with at least a portion of the distance $d_n$ and a second portion that does not overlap with any portion of the distance $d_n$. In other words, a portion of the second distance $d_2$ is contained within at least a portion of the first distance $d_1$ and another portion of the second distance $d_2$ is not contained within any portion of the first distance $d_1$. The fraction of the second distance $d_2$ that completely overlaps with the first distance $d_1$ may e.g. be between 25% and 75% of the second distance.

In the example of FIG. 2, the auxiliary print head 106 is arranged such that one half of the second distance $d_2$ completely overlaps with the first distance $d_1$ and the other half of the second distance $d_2$ does not overlap the first distance $d_1$. Accordingly, one half of the pre-treatment nozzles 108 may overlap with the printing nozzles 104 and the other half of the pre-treatment nozzles 108, may not overlap with the printing nozzles 104. In the example of FIG. 2, pre-treatment nozzles that overlap with the printing nozzles 104 correspond to the non-selected subset 108B and the pre-treatment nozzles that do not overlap with the printing nozzles 104 correspond to the selected subset 108A. In other examples, as detailed below with reference to FIG. 3, the subsets 108A and 108B may be selected differently, e.g. for print media with different print medium parameters.

The subset of pre-treatment nozzles 108A selected by the controller 110 is distributed over a third distance $d_3$ perpendicular to the scanning direction X. As mentioned above, the subset 108A is a variable subset selected based on the print medium parameter that is to be used for application of the pre-treatment fluid, e.g. for a particular type of print medium. The controller 110 may for example the subset 108A such that the third distance $d_3$ partially overlaps with the first distance $d_1$ for a first type of print medium, completely overlaps with the first distance $d_2$ for a second type of print medium and does not overlap with the first distance $d_1$ for a third type of print medium. As used herein, a distance $d_m$ completely overlaps with a distance $d_n$ if the entire distance $d_m$ overlaps with at least a portion of the distance $d_n$ and a distance $d_m$ does not overlap with a distance $d_n$ if the distance $d_m$ does not overlap with any portion of the distance $d_n$. The first, second and third types of print medium may be associated with different values of the print medium parameter. The first, second and third types of print medium may for example have a different thermal inertia and/or a different porosity, e.g. as detailed below with reference to FIG. 4.

The controller 110 may further be to determine a number of nozzles in the subset of pre-treatment nozzles 108A, also referred to as the size of the subset 108A, based on the print medium parameter and/or the type of print medium. For this, the controller 110 may for example determine a length of the third distance $d_3$, e.g. a first length for the first type of medium, a second length for the second type of medium and a third length for the third type of medium. The controller 110 may e.g. determine how many of the groups 108-1 to 108-N the subset 108A comprises. Additionally or alternatively, the controller 110 may determine which of the nozzles within the third distance $d_3$ belong to the subset 108A, i.e. may assign some of the nozzles within the third distance $d_3$ to the remaining subset 108B.

The controller 110 may also be to determine an amount of pre-treatment fluid to be ejected from the subset of pre-treatment nozzles 108A based on the print medium parameter and/or the type of print medium. For this, the controller 110 may e.g. determine an amount of pre-treatment fluid to be ejected from the subset of pre-treatment nozzles 108A during a pass of the carriage 202 across a print medium and/or a number of passes of the carriage 202 across the print medium. The controller 110 may for example determine a total amount of the pre-treatment fluid to be ejected from the subset of pre-treatment nozzles 108A onto a given position on a print medium based on the type of print medium. In some examples, the controller 110 may determine the total amount based on the amount of printing fluid to be deposited onto this position, e.g. a certain fraction of the amount of printing fluid to be deposited onto this position. For example, the pretreatment fluid amount may be between 10% and 50% of the printing fluid amount deposited in a same unit area.

In some examples, the controller 110 may also be to select a masking mode for the subset of pre-treatment nozzles 108A based on the print medium parameter and/or the type of print medium. The masking mode may be associated with a type of mask to be applied to the subset of pre-treatment nozzles 108A. The mask specifies which of the nozzles from the subset 108A are used to eject pre-treatment fluid during a pass of the carriage and/or specifies the amount of pre-treatment fluid to be ejected during a pass for each of the nozzles of the subset 108A. The mask may e.g. specify a firing frequency as a function of the position of a nozzle. The type of mask may for example be a ramp mask or an interleaving mask. A ramp mask may comprise a ramp-up portion with an increasing firing frequency, a center portion with a constant firing frequency and a ramp-down portion with a decreasing firing frequency. An inter-leaving mask may specify a spatially modulated firing frequency, which may additionally be offset perpendicular to the scanning direction between subsequent passes and/or between different rows of nozzles.

FIGS. 3*a*-3*f* illustrate various examples of patterns 300-310 for applying the pre-treatment fluid, wherein the subset of pre-treatment nozzles 108A selected by the controller 110 is illustrated by squares marked with an "x" and the non-selected subset 108B is illustrated as open squares. The patterns 300-310 may be selected by the controller based on the print medium parameter and/or the type of print medium by selecting the subset 108A as described above, in particular by determining an amount of overlap of the third distance and the first distance and/or determining a length of the third distance.

Figure 3A:
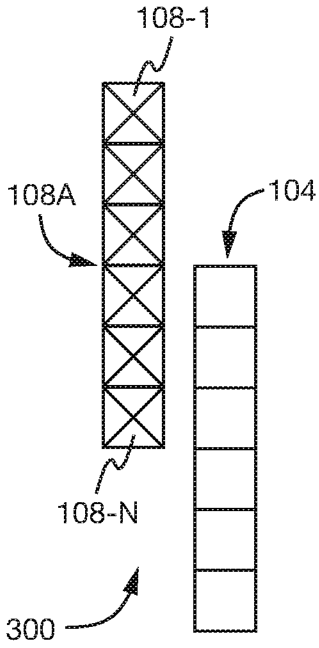
FIG. 3*a*-3*f*: patterns for applying a pre-treatment fluid according to an example.

FIG. 3*a* depicts a pattern 300, for which the subset 108A partially overlaps with the printing nozzles 104 such that the third distance $d_3$ is partially contained within the first distance $d_1$. Accordingly, the pattern 300 may e.g. be used for the first type of print medium. In the example of FIG. 3*a*, the subset 108A comprises all of the pre-treatment nozzles 108.

Figure 3B:
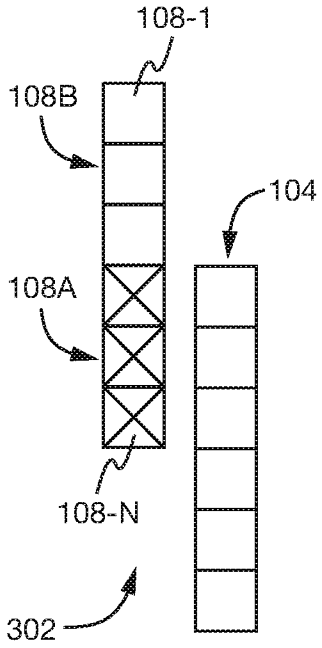

FIG. 3*b* depicts a pattern 302, for which the subset 108A completely overlaps with the printing nozzles 104 such that the third distance $d_3$ is completely contained within the first distance $d_1$. Accordingly, the pattern 302 may e.g. be used for the second type of print medium.

Figure 3C:
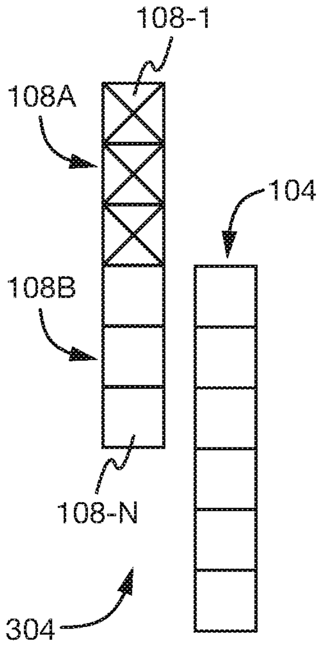

FIG. 3*c* depicts a pattern 304, for which the subset 108A does not overlap with the printing nozzles 104 such that the third distance $d_3$ is not contained within the first distance $d_1$. Accordingly, the pattern 304 may e.g. be used for the third type of print medium.

Figure 3D:
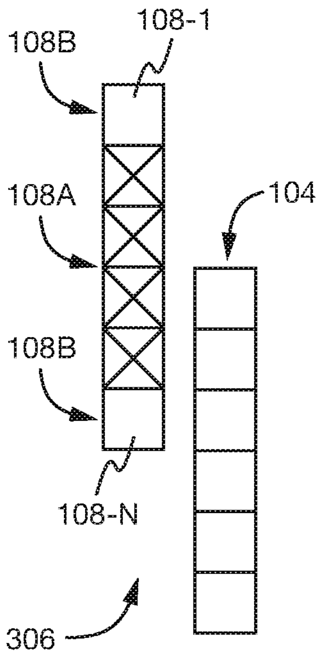
Figure 3E:
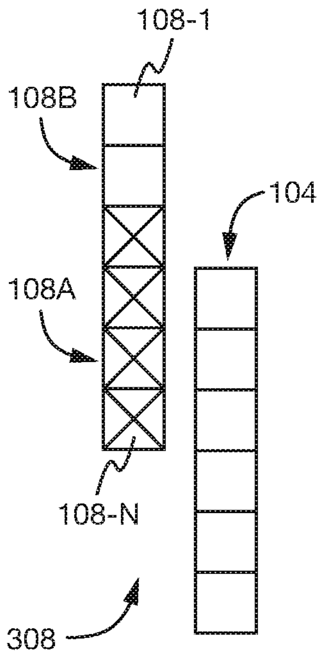
Figure 3F:
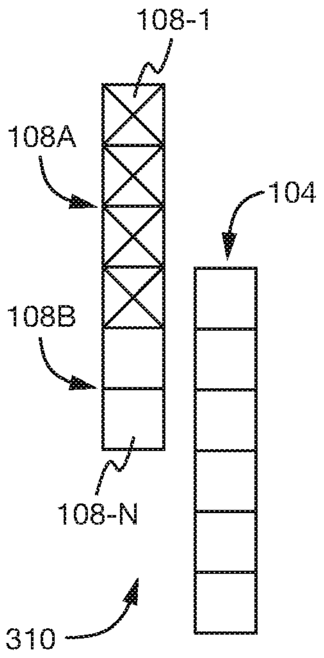

FIGS. 3*d*-3*f* depict patterns 306, 308 and 310, respectively, for which the subset 108A partially overlaps with the printing nozzles 104 similar to the pattern 300. Accordingly, the patterns 306-310 may e.g. also be used for the third type of print medium. The degree of overlap, corresponding to the fraction of the third distance $d_3$ completely overlapping with the first distance $d_1$, varies for the patterns 306-310. The patterns 306-310 may thus also be used for other types of print medium to allow for a finer adjustment of the pre-treatment application to a given print medium.

The pattern 306 of FIG. 3*d* is similar to the pattern 300 in that the same fraction of the third distance $d_3$ completely overlaps with the first distance $d_1$, e.g. 50% in the examples of FIGS. 3*a* and 3*d*. However, the size of the subset 108A, i.e. the number of nozzles in the subset 108A, is different for the patterns 300 and 306. The subset 108A of the pattern 306 is smaller than the subset 108A of the pattern 300 and does not comprise all of the pretreatment nozzles 108. The pattern 306 may for example be used for a fourth type of print medium that is similar to the first type of print medium.

The pattern 308 of FIG. 3*e* corresponds to an intermediate configuration between the patterns 300 and 302. In contrast to the pattern 302, the subset 1081 of the pattern 308 also comprises some pre-treatment nozzles that do not overlap with the printing nozzles 104, i.e. the third distance $d_3$ comprises a small portion that is not contained in the first distance $d_1$. Accordingly, the pattern 308 may for example be used for a fifth type of print medium that is similar to the first and second types of print medium.

The pattern 310 of FIG. 3*f* corresponds to an intermediate configuration between the patterns 300 and 304. In contrast to the pattern 304, the subset 108A of the pattern 310 also comprises some pre-treatment nozzles that overlap with the printing nozzles 104, i.e. the third distance $d_3$ comprises a small portion that is completely contained in the first distance $d_1$. Accordingly, the pattern 310 may for example be used for a sixth type of print medium that is similar to the first and third types of print medium.

In some examples, the subset 108A may not be contiguous. The subset 108A may e.g. contain some, but not all of the pre-treatment nozzles within the third distance $d_3$. The subset 108A may for example contain the pre-treatment nozzle groups 108-1, 108-3, and 108-5, but not the groups 108-2, 108-4, and 108-6. Additionally or alternatively, the subset 108A may e.g. contain some, but not all of pre-treatment nozzles of a nozzle group, e.g. 50% of the pre-treatment nozzles of each of the groups 108-1 to 108-6.

FIG. 4 shows a table 400 of pre-treatment schemes 402-408 in accordance with an example. The pre-treatment schemes 402-408 may be selected by the controller 110 based on a type of print medium. In the example of FIG. 4, the type of print medium characterizes a thermal inertia and porosity of the print medium, which correspond to the print medium parameter in this example. A given type of print medium may for example comprise print media for which the respective parameters are within certain predetermined ranges. The pre-treatment schemes 402-408 as well as the type of a given print medium may for example be determined empirically, e.g. based on image quality attributes such as an amount of bleeding, banding, coalescence or gloss.

A type "A" of print medium may e.g. have a high thermal inertia, but a low porosity. The type "A" of print medium may for example comprise print media comprising polyvinyl chloride (PVC), PVC foam, glass and/or aluminum composite panels. The controller 110 may e.g. select a pre-treatment scheme 402 for print media of the type "A", which specifies a pre-treatment pattern with a partial overlap of the subset 108A with the printing nozzles 104 and a small size of the subset 108A, e.g. the pattern 306 of FIG. 3*d*. The pre-treatment scheme 402 may further specify a medium amount of pre-treatment fluid to be applied (PT amount), e.g. between 10% and 20% of the amount of printing fluid to be applied, and the use of an interleaving mask.

A type "B" of print medium may e.g. have a high thermal inertia and a high porosity. The type "B" of print medium may for example comprise print media comprising uncoated paper, foam board, cardboard, textiles and wood. The controller 110 may e.g. select a pre-treatment scheme 404 for print media of the type "B", which specifies a pre-treatment pattern with no overlap of the subset 108A with the printing nozzles 104 and a small size of the subset 108A, e.g. the pattern 304 of FIG. 3*c*. The pre-treatment scheme 404 may further specify a large amount of pre-treatment fluid to be applied, e.g. between 30% and 40% of the amount of printing fluid to be applied, and the use of an interleaving mask. A large amount of pre-treatment fluid applied with a small number of nozzles may reduce penetration of the pre-treatment fluid into the medium by saturating surface pores and may prevent ink bleeding.

A type "C" of print medium may e.g. have a low thermal inertia and a low porosity. The type "C" of print medium may for example comprise print media comprising metal sheets, plastic sheets or plastic films. The controller 110 may e.g. select a pre-treatment scheme 406 for print media of the type "C", which specifies a pre-treatment pattern with a partial overlap of the subset 108A with the printing nozzles 104 and a large size of the subset 108A, e.g. the pattern 300 of FIG. 3*a*. The pre-treatment scheme 406 may further specify a medium amount of pre-treatment fluid to be applied and the use of a ramp mask. A partial or complete overlap may reduce the time between application of the pre-treatment fluid and the printing fluid and may thus reduce evaporation of the pre-treatment fluid prior to application of the printing fluid. A partial or complete overlap may allow for depositing pre-treatment and printing fluids during the same pass of the carriage 202, in particular in an alternating fashion by first depositing pre-treatment fluid and then printing fluid in one pass and repeating this process during subsequent passes.

A type "D" of print medium may e.g. have a low thermal inertia, but a high porosity. The type "D" of print medium may for example comprise print media comprising ceramics, paper liner and plastic cores. The controller 110 may e.g. select a pre-treatment scheme 408 for print media of the type "D", which specifies a pre-treatment pattern with a complete overlap of the subset 108A with the printing nozzles 104 and a small size of the subset 108A, e.g. the pattern 302 of FIG. 3*b*. The pre-treatment scheme 408 may further specify a medium amount of pre-treatment fluid to be applied and the use of a ramp mask.

Figure 5:
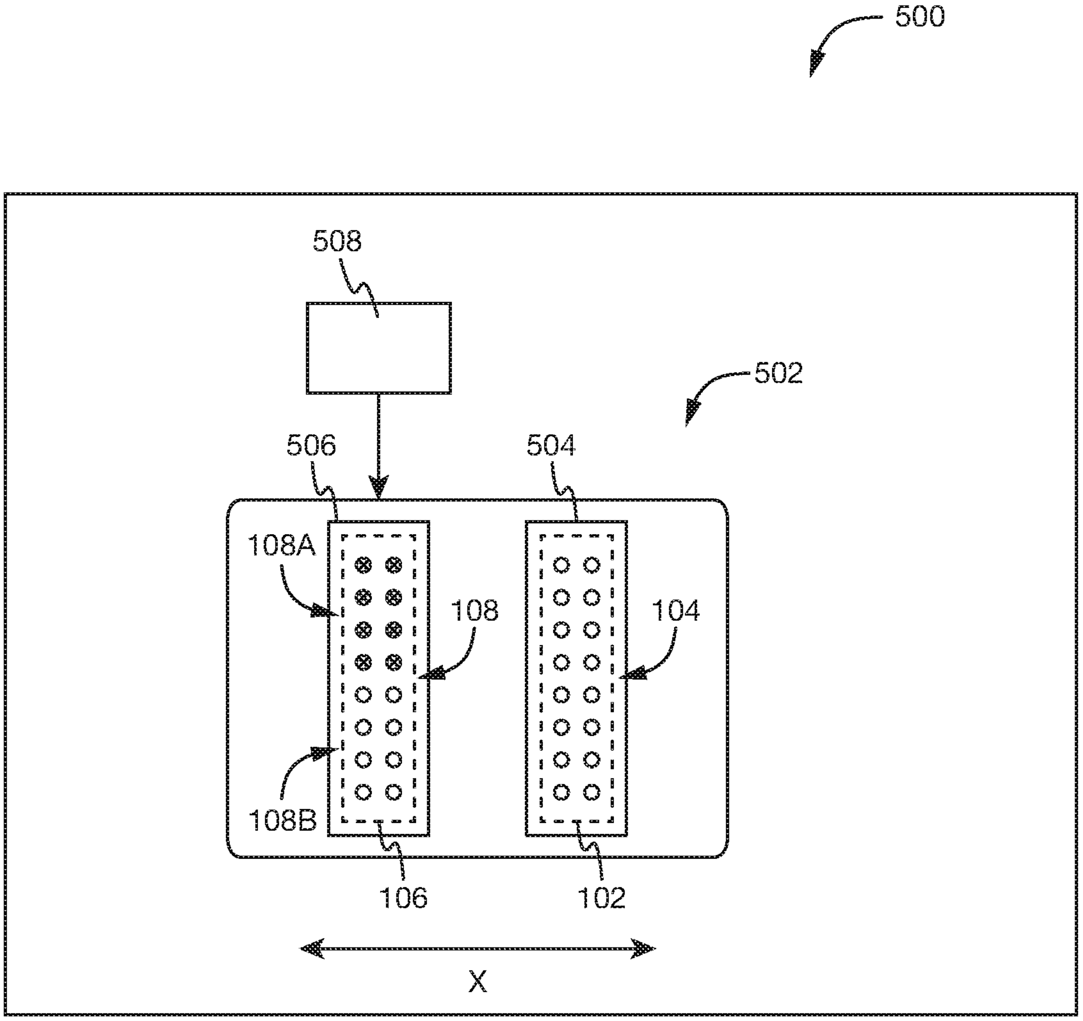
FIG. 5: a printing device in accordance with an example.

FIG. 5 illustrates a printing device 500 in accordance with an example. The printing device may for example be an ink-jet printer. The printing device 500 comprises a print head carriage 502 that is movable along a scanning direction X. The carriage 502 comprises a main slot 504 that is to receive a main print head 102 with a plurality of printing nozzles 104, which may e.g. be similar to the main print head of FIG. 1 or 2. The carriage 502 further comprises an auxiliary slot 506 that is to receive an auxiliary print head 106 with a plurality of pre-treatment nozzles 108, which may e.g. be similar to the auxiliary print head of FIG. 1 or 2. In some examples, the carriage 502 may be similar to the print head carriage 202 of FIG. 2 and may e.g. also comprise multiple main slots.

The printing device 500 further comprises a controller 508 that is to determine or obtain a print medium parameter and to select a subset 108A of the plurality of pre-treatment nozzles 108 for application of the pre-treatment fluid based on the print medium parameter. The print medium parameter depends on a thermal conductivity of the print medium. In some examples, the print medium parameter may depend on the thermal inertia of the print medium, i.e. may depend on the thermal conductivity and a heat capacity of the print medium. The print medium parameter may additionally depend on other properties of the print medium, for example a porosity of print medium. In some examples, the print medium parameter may be specified by a type of print medium, e.g. as described above with reference to FIG. 4.

In some examples, the controller may be similar to the controller 110 of the print head arrangement 100 or 200. The controller 508 may e.g. determine the print medium parameter through a user selection or a media type detector as detailed below. The controller 508 may select the subset of pre-treatment nozzles 108A as described above with reference to FIGS. 1-4. The controller 508 may be to execute the methods 700 and/or 800 described below or at least a part thereof. In some examples, the controller 508 may also control the movement of the carriage 502 and/or application of the printing fluid. In one example, the controller 508 may be a main controller of the printing device 500 and/or may be integrated therein.

Figure 6:
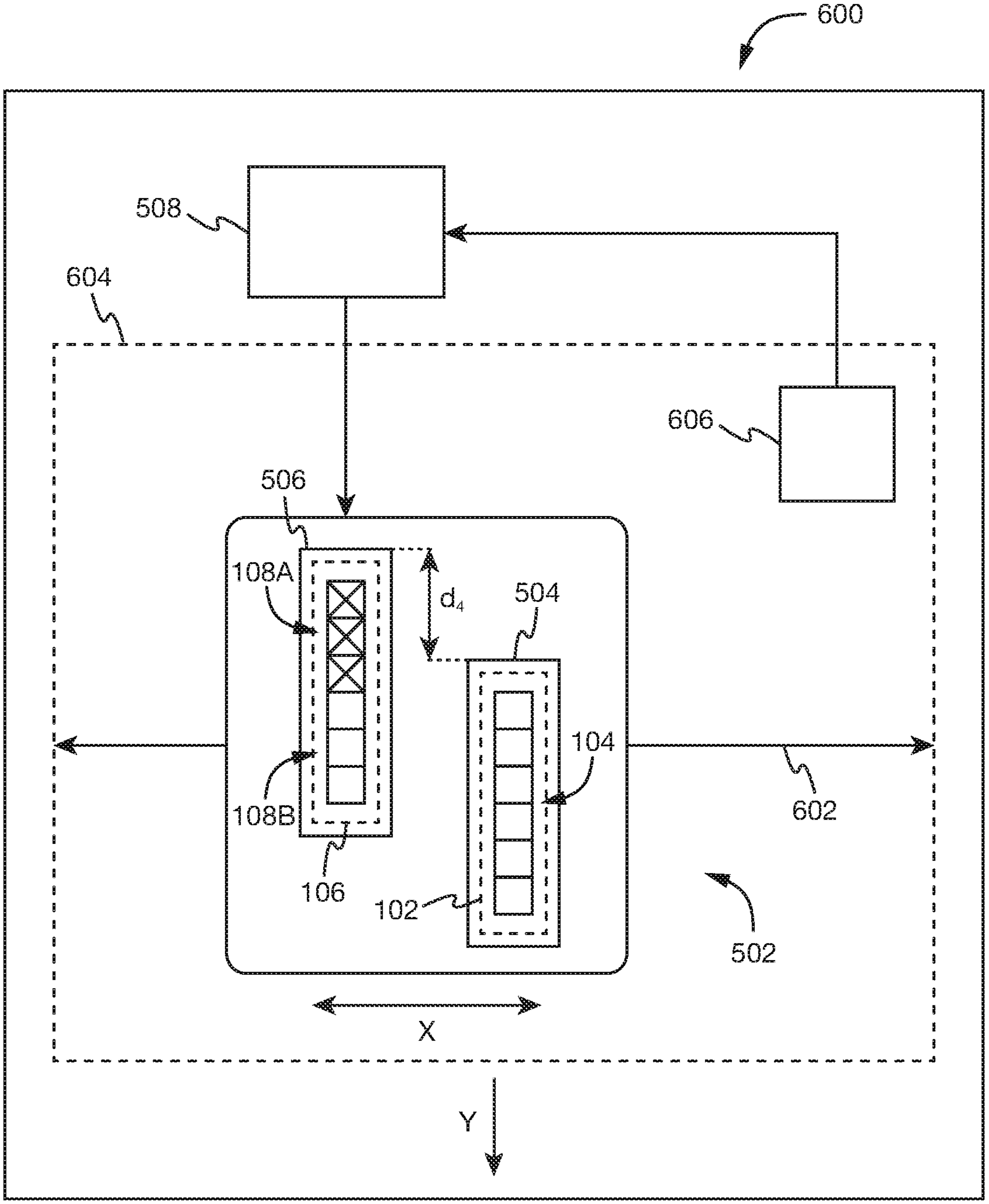
FIG. 6: a printing device having a print head carriage with partially overlapping main and auxiliary slots according to an example.

FIG. 6 depicts a schematic illustration of a printing device 600 in accordance with another example. Similar to the printing device 500, the printing device 600 also comprises a print head carriage 502 with a main slot 504 and an auxiliary slot 506 as well as a controller 508. The carriage 502 is movable along a print head path 602 extending in a scanning direction X across a print medium 604. During execution of a print job, the print medium 604 may be moved along a media advance direction Y while the carriage 502 repeatedly passes back and forth along the print head path 602. The scanning direction X may e.g. be perpendicular to the media advance direction Y.

In the printing device 600, the auxiliary slot 506 partially overlaps with the main slot 504 in a direction perpendicular to the scanning direction. In the context of the present disclosure, a first element partially overlaps with a second element if the first element comprises a first portion that completely overlaps with at least a part of the second element and a second portion that does not overlap with any part of the second element. In other words, the auxiliary slot 506 may be offset from the main slot 504 by a fourth distance $d_4$ perpendicular to the scanning direction as shown in FIG. 6. The main slot 504 and the auxiliary slot 506 may have the same size and may be to receive print heads of the same size, in particular print heads with the same nozzle layout. Offsetting the auxiliary slot 506 from the main slot

504 may allow for selecting the subset 308A similar to the patterns 300-310 of FIGS. 3*a*-3*f*.

In some examples, the subset of pre-treatment nozzles 108A selected by the controller 508 may partially overlap with the printing nozzles 104 along the media advance direction Y for a first type of print medium, may completely overlap with the printing nozzles 104 along the media advance direction Y for a second type of print medium and may not overlap with the printing nozzles 104 along the media advance direction Y for a third type of print medium. The first, second and third types of print medium may for example differ in the print medium parameter, i.e. may e.g. exhibit a different thermal conductivity and/or a different thermal inertia.

The printing device 600 further comprises a media type detector 606 that is to detect the type of the print medium 604. The media type detector 606 may for example detect the type of the print medium 604 by an optical measurement, e.g. by measuring a reflectivity of the print medium 604. Additionally or alternatively, the media type detector 606 may for example determine an infra-red spectrum emitted by the print medium 604, e.g. to assess a thermal conductivity and/or thermal inertia of the print medium 604. In some examples, the media type detector 606 may determine a thickness of the print medium 604.

The controller 508 may be to determine a number of passes of the carriage 502 for applying the pre-treatment fluid based on the type of print medium. For this, the controller 508 may for example determine a size of the subset of pre-treatment nozzles 108A, e.g. a length of the third distance $d_3$ and/or a number of nozzles in the subset 108A, and/or a media advance distance per pass of the carriage 502. In one example, the media advance distance may correspond to the length of a group of nozzles in the media advance direction Y, e.g. one of the nozzle groups 108-1 to 108-N shown in FIG. 2. Accordingly, the number of nozzle groups contained in the subset 108A may determine the number of passes of the carriage 502 for applying the pre-treatment fluid onto a given position on the print medium 604.

The controller 508 may further be to determine, based on the print medium parameter and/or type of print medium, an amount of pre-treatment fluid to be ejected from the subset 108A, a masking mode for the subset 108A and/or a number of nozzles in the subset 108A, e.g. as described above for the controller 110.

Figure 7:
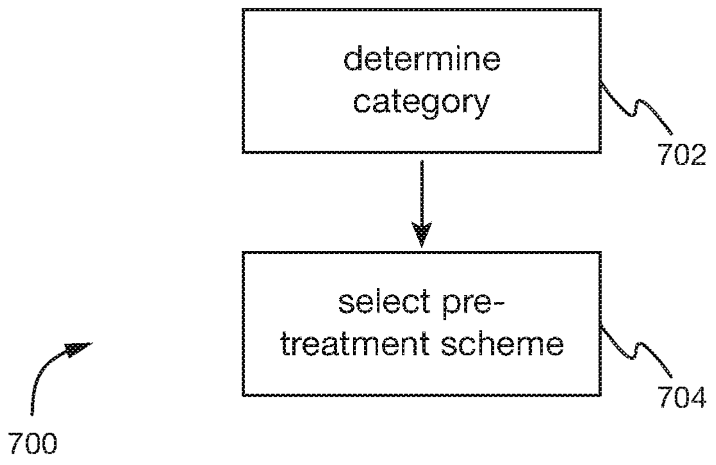
FIG. 7: a method of operating a printing device in accordance with an example.

FIG. 7 shows a flow chart of a method 700 of operating a printing device in accordance with an example. The printing device comprises a set of print heads with a plurality of printing nozzles for ejecting a printing fluid and a plurality of pre-treatment nozzles for ejecting a pre-treatment fluid. The method 700 may for example be executed with a printing device comprising one of the print head arrangements 100 and 200, with one of the printing devices 500 and 600 and/or with a computing device connected to a corresponding printing device. In the following, the method 700 is described using the printing device 500 as a non-limiting example.

The method 700 comprises, at block 702, determining a category that a print medium to be used with the printing device 500 is associated with. The category may for example be selected by a user or may be determined using a media type detector. Print media are grouped into the categories based on a heat capacity of the print media. A category may for example comprise print media with a heat capacity within a respective predetermined range, e.g. a "small" heat capacity, a "medium" heat capacity or a "large" heat capacity. In some examples, print media may be grouped into the categories based on a thermal inertia of the print media. Additionally, print media may be grouped into the categories based on other parameters of the print media, for example a porosity of the print media.

The method 700 also comprises, at block 704, selecting a pre-treatment scheme depending on the category of the print medium. The printing device 500, in particular the controller 508, may for example comprise a storage medium containing a table associating a pre-treatment scheme to each category, e.g. similar to table 400. Based on the category determined in block 702, the respective pre-treatment scheme may be obtained from the table. The pre-treatment scheme may for example specify a subset of pre-treatment nozzles 108A for applying the pre-treatment fluid, e.g. a pre-treatment pattern with a certain overlap and a certain size of the subset 108A. In some examples the pre-treatment scheme may also specify an amount of pre-treatment fluid to be ejected from the subset 108A and/or a masking mode.

Figure 8:
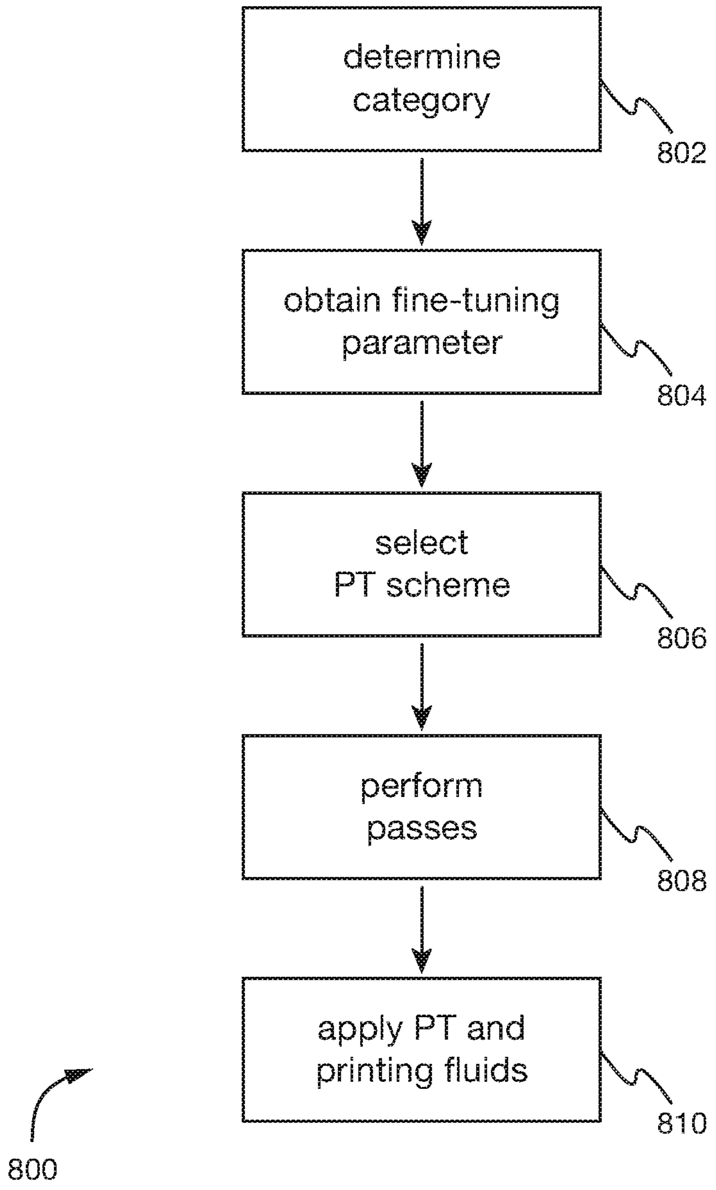
FIG. 8: another method of operating a printing device according to an example.

FIG. 8 shows a flow chart of a method 800 of operating a printing device according to another example. The method 800 may for example also be executed with a printing device comprising one of the print head arrangements 100 and 200, with one of the printing devices 500 and 600 and/or with a computing device connected to a corresponding printing device. In the following, the method 800 is described using the printing device 600 as a non-limiting example. Execution of the method 800 is not limited to the order of execution indicated by the flow chart of FIG. 8. As far as technically feasible, the method 800 may be executed in an arbitrary order and parts thereof may be executed simultaneously at least in part.

The method 800 comprises, at block 802, determining a category that a print medium to be used with the printing device 600 is associated with, e.g. as in block 702 of method 700, and, at block 806, selecting a pre-treatment scheme depending on the category of the print medium, e.g. as in block 704 of method 700. Selecting a pre-treatment scheme may comprise selecting a subset 108A of the plurality of pre-treatment nozzles 108 for application of the pre-treatment fluid based on the type of print medium.

The method 800 may further comprise, at block 804, obtaining a fine-tuning parameter that characterizes at least one of a thermal inertia and a porosity of the print medium. In block 806, the pre-treatment scheme may be selected depending on the category of the print medium and the fine-tuning parameter. Both the category and the fine-tuning parameter may be provided by a user, e.g. through a corresponding selection using a driver of the printing device 600. Alternatively, the category and/or the fine-tuning parameter may be determined automatically, e.g. using the media type detector 606. Selecting the pre-treatment scheme depending on the category and the fine-tuning parameter may facilitate adjusting application of the pre-treatment fluid to the print medium 604. In one example, a user may first be prompted to select a category of the print medium and may subsequently adjust the fine-tuning parameter, e.g. based on the result of a test print.

An example for this is illustrated in FIG. 9, which depicts a table 900 of pre-treatment schemes 902-906 in accordance with an example. The pre-treatment schemes 902-906 are to be selected based on a fine-tuning parameter for a print medium category "a". The table 900 may also comprise additional entries, for example for other print medium categories and/or other values of the fine-tuning parameter. The table 900 may for example be stored on a storage medium in the printing device 600.

In this example, the fine-tuning parameter characterizes a porosity of the print medium. When the category "a" is selected, which may e.g. comprise media with a small heat capacity and/or thermal inertia, the user may for example choose between three settings for the fine-tuning parameter, a "low" porosity, a "medium" porosity, and a "high" porosity. Based on the fine-tuning parameter, the overlap and size of the subset 108A may e.g. be adjusted.

For a print medium with a low porosity, a subset of pre-treatment nozzles 108A similar to pattern 300 of FIG. 3*a* may be selected, i.e. a partial overlap of the subset 108A with the printing nozzles 104 and a large size of the subset 108A. For a medium with a high porosity, a subset 108A similar to pattern 302 of FIG. 3*b* may be selected, i.e. a complete overlap of the subset 108A with the printing nozzles and a small size of the subset 108A. For a medium with a medium porosity, an intermediate pattern may be selected, e.g. similar to pattern 308 of FIG. 3*e*, i.e. a partial overlap of the subset 108A with the printing nozzles 104 and a medium size of the subset 108A.

The method 800 may also comprise, at block 808, repeatedly passing the set of print heads 102, 106 across the print medium 604 in a scanning direction and, at block 810, applying the pre-treatment fluid and the printing fluid onto the print medium 604 according to the pre-treatment scheme.

For a first category of print media, the pre-treatment scheme may for example comprise ejecting pre-treatment fluid from a first pre-treatment nozzle or a first group of pre-treatment nozzles during a first pass of the set of print heads 102, 106 without ejecting printing fluid from printing nozzles or groups of printing nozzles aligned with the first pre-treatment nozzle and first group of pre-treatment nozzles, respectively, along the scanning direction during the first pass. The pre-treatment scheme may further comprise ejecting pre-treatment fluid from a second pre-treatment nozzle or a second group of pre-treatment nozzles during a second pass of the set of print heads 102, 106 and ejecting printing fluid from a printing nozzle or group of printing nozzles aligned with the second pre-treatment nozzle and second group of pre-treatment nozzles, respectively, along the scanning direction during the second pass.

In the context of this disclosure, a pass may for example refer to passing the carriage 502 along the print head path 602 once in one direction, e.g. forward or backward. In other examples, a pass may refer to passing the carriage 502 along the print head path 602 back and forth once or to passing the carriage 502 along the print head path 602 multiple times, but without moving the print medium 604. A pre-treatment nozzle and a printing nozzles may for example be aligned along the scanning direction if the nozzles fire at the same position on the print medium 604 during a pass of the carriage 502, e.g. if the nozzles are located at the same position along the media advance direction Y.

For the first category of print media, a pre-treatment pattern with partial overlap may e.g. be selected such as the pattern 300. During each pass, pre-treatment fluid may e.g. be ejected from each of the nozzle groups in the subset 1081, e.g. the nozzle groups 108-1 to 108-N, and printing fluid may be ejected from each of the nozzle groups of the main print head 102.

Accordingly, the first pre-treatment nozzle may be a nozzle in a portion of the subset 108A that does not overlap with the printing nozzles 104 and the second pre-treatment nozzle may be a nozzle in a portion of the subset 108A that overlaps completely with the printing nozzles 104.

The pre-treatment scheme may also comprise, for a second category of print media, for each pre-treatment nozzle or group of pre-treatment nozzles from which pretreatment fluid is ejected during a pass of the set of print heads 102, 106, ejecting printing fluid from a printing nozzle or group of printing nozzles aligned with the respective pre-treatment nozzle or group of pre-treatment nozzles along the scanning direction. This may for example be achieved using a pre-treatment pattern with complete overlap, e.g. the pattern 302. During a pass, pre-treatment fluid may for example be ejected from each group of pre-treatment nozzles in the subset 108A and printing fluid may be ejected from at least the groups of printing nozzles aligned with the respective groups of pre-treatment nozzles.

The pre-treatment scheme may further comprise, for a third category of print media, ejecting pre-treatment fluid from a set of pre-treatment nozzles, e.g. the subset 108A, during a pass of the set of print heads without ejecting printing fluid from any printing nozzle or group of printing nozzles aligned with a nozzle of the set of pre-treatment nozzles along the scanning direction. This may for example be achieved using a pre-treatment pattern with no overlap, e.g. the pattern 304.

The method 700 or 800 may also comprise determining an amount of pre-treatment fluid to be ejected from the first pre-treatment nozzle or first group of pre-treatment nozzles, the second pre-treatment nozzle or second group of pre-treatment nozzles and/or the subset 108A based on the type of print medium. The method 700 or 800 may further comprise determining a masking mode for the first pre-treatment nozzle or first group of pre-treatment nozzles, the second pre-treatment nozzle or second group of pre-treatment nozzles and/or the subset 108A based on the type of print medium.

The description is not intended to be exhaustive or limiting to any of the examples described above. The print head arrangement, the printing device and the method of operating a printing device disclosed herein can be implemented in various ways and with many modifications without altering the underlying basic properties.

The invention claimed is:

1. A print head arrangement comprising:

a main print head having a plurality of printing nozzles for ejecting a printing fluid;

an auxiliary print head having a plurality of pre-treatment nozzles for ejecting a pre-treatment fluid; and a controller that is to obtain a print medium parameter and to select a subset of the plurality of pre-treatment nozzles for application of the pre-treatment fluid based on the print medium parameter, wherein the print medium parameter characterizes a thermal inertia of the print medium, wherein the thermal inertia is a measure of how fast a temperature of the print medium increases when heating the print medium based on a heat capacity and a thermal conductivity of the print medium.

2. The print head arrangement of claim 1, wherein the print medium parameter further characterizes a porosity of the print medium.

3. A print head arrangement comprising:

a main print head having a plurality of printing nozzles for ejecting a printing fluid;

an auxiliary print head having a plurality of pre-treatment nozzles for ejecting a pre-treatment fluid; and a controller that is to obtain a print medium parameter and to select a subset of the plurality of pre-treatment nozzles for application of the pre-treatment fluid based on the print medium parameter, wherein the print medium parameter characterizes a thermal inertia of the print medium, wherein the print medium parameter further characterizes a porosity of the print medium, and wherein the printing nozzles are distributed over a first distance perpendicular to a scanning direction, the pre-treatment nozzles are distributed over a second distance perpendicular to the scanning direction, the second distance partially overlaps with first distance, and the subset of pre-treatment nozzles is distributed over a third distance that:

partially overlaps with the first distance for a first type of print medium;

completely overlaps with the first distance for a second type of print medium; and does not overlap with the first distance for a third type of print medium, the first, second and third types of print medium having different print medium parameters.

4. The print head arrangement of claim 1, wherein the controller is to determine a number of nozzles in the subset of pre-treatment nozzles based on the print medium parameter.

5. The print head arrangement of claim 1, wherein the controller is to determine an amount of pre-treatment fluid to be ejected from the subset of pre-treatment nozzles based on the print medium parameter.

6. The print head arrangement of claim 1, wherein the controller is to select a masking mode for the subset of pre-treatment nozzles based on the print medium parameter.

7. A printing device comprising a print head carriage and a controller, wherein:

the print head carriage is movable along a scanning direction;

the print head carriage comprises a main slot that is to receive a main print head with a plurality of printing nozzles and an auxiliary slot that is to receive an auxiliary print head with a plurality of pre-treatment nozzles; and the controller is to determine a print medium parameter and to select a subset of the plurality of pre-treatment nozzles for application of the pre-treatment fluid based on the print medium parameter, wherein the print medium parameter depends on a thermal inertia of the print medium, wherein the thermal inertia is a measure of how fast a temperature of the print medium increases when heating the print medium based on a heat capacity and a thermal conductivity of the print medium.

8. The printing device of claim 7, wherein the auxiliary slot partially overlaps with the main slot in a direction perpendicular to the scanning direction.

9. A printing device comprising a print head carriage and a controller, wherein:

the print head carriage is movable along a scanning direction;

the print head carriage comprises a main slot that is to receive a main print head with a plurality of printing nozzles and an auxiliary slot that is to receive an auxiliary print head with a plurality of pre-treatment nozzles; and the controller is to determine a print medium parameter and to select a subset of the plurality of pre-treatment nozzles for application of the pre-treatment fluid based on the print medium parameter, wherein the print medium parameter depends on a thermal conductivity of the print medium, wherein the subset of pre-treatment nozzles:

partially overlaps with the printing nozzles along a media advance direction, perpendicular to the scanning direction, for a first type of print medium;

completely overlaps with the printing nozzles along the media advance direction for a second type of print medium; and does not overlap with the printing nozzles along the media advance direction for a third type of print medium, the first, second and third types of print medium having different print medium parameters.

10. The printing device of claim 7, further comprising a media type detector that is to detect the type of print medium.

11. The printing device of claim 7, wherein the controller is to determine a number of passes of the print head carriage for applying the pre-treatment fluid based on the type of print medium.

12. A method of operating a printing device, wherein the printing device comprises a set of print heads with a plurality of printing nozzles for ejecting a printing fluid and a plurality of pre-treatment nozzles for ejecting a pre-treatment fluid, the method comprising:

determining a category that a print medium to be used with the printing device is associated with;

selecting a pre-treatment scheme depending on the category of the print medium, wherein print media are grouped into the categories based on a thermal inertia of the print media, wherein the thermal inertia is a measure of how fast a temperature of the print medium increases when heating the print medium based on a heat capacity and a thermal conductivity of the print medium.

13. The method of claim 12, further comprising:

repeatedly passing the set of print heads across the print medium in a scanning direction; and applying the pre-treatment fluid and the printing fluid onto the print medium according to the pre-treatment scheme, wherein, for a first category of print media, the pre-treatment scheme comprises:

ejecting pre-treatment fluid from a first pre-treatment nozzle during a first pass of the set of print heads without ejecting printing fluid from printing nozzles aligned with the first pre-treatment nozzle along the scanning direction during the first pass; and ejecting pre-treatment fluid from a second pre-treatment nozzle during a second pass of the set of print heads and ejecting printing fluid from a printing nozzle aligned with the second pre-treatment nozzle along the scanning direction during the second pass.

14. A method of operating a printing device, wherein the printing device comprises a set of print heads with a plurality of printing nozzles for ejecting a printing fluid and a plurality of pre-treatment nozzles for ejecting a pre-treatment fluid, the method comprising:

determining a category that a print medium to be used with the printing device is associated with;

selecting a pre-treatment scheme depending on the category of the print medium, wherein print media are grouped into the categories based on a heat capacity of the print media, the method further comprising:

repeatedly passing the set of print heads across the print medium in a scanning direction; and applying the pre-treatment fluid and the printing fluid onto the print medium according to the pre-treatment scheme, wherein, for a first category of print media, the pre-treatment scheme comprises:

ejecting pre-treatment fluid from a first pre-treatment nozzle during a first pass of the set of print heads without ejecting printing fluid from printing nozzles aligned with the first pre-treatment nozzle along the scanning direction during the first pass; and ejecting pre-treatment fluid from a second pre-treatment nozzle during a second pass of the set of print heads and ejecting printing fluid from a printing nozzle aligned with the second pre-treatment nozzle along the scanning direction during the second pass, wherein the pre-treatment scheme further comprises:

for a second category of print media, for each pre-treatment nozzle from which pretreatment fluid is ejected during a pass of the set of print heads, ejecting printing fluid from a printing nozzle aligned with the respective pre-treatment nozzle along the scanning direction; and for a third category of print media, ejecting pre-treatment fluid from a set of pre-treatment nozzles during a pass of the set of print heads without ejecting printing fluid from any printing nozzle aligned with a nozzle of the set of pre-treatment nozzles along the scanning direction.

15. The method of claim 12, further comprising obtaining a fine-tuning parameter, wherein the fine-tuning parameter characterizes at least one of a thermal inertia and a porosity of the print medium and wherein the pre-treatment scheme is selected depending on the category of the print medium and the fine-tuning parameter.

* * * * *